June 18, 1974 R. W. ORLOMOSKI ET AL Re. 28,049

THREAD ROLLING DIE WITH STABILIZING PORTION

Original Filed April 1, 1968

United States Patent Office

Re. 28,049
Reissued June 18, 1974

28,049
THREAD ROLLING DIE WITH STABILIZING PORTION

Roger W. Orlomoski, Paxton, Mass., assignor to Litton Industrial Products, Inc., Holden, Mass.

Original No. 3,538,740, dated Nov. 10, 1970, Ser. No. 717,700, Apr. 1, 1968. Application for reissue July 20, 1972, Ser. No. 273,476
Int. Cl. B21h *3/06*
U.S. Cl. 72—469 5 Claims

Matter enclosed in heavy brackets [ ] appears in the original patent but forms no part of this reissue specification; matter printed in italics indicates the additions made by reissue.

ABSTRACT OF THE DISCLOSURE

This invention is directed to thread rolling dies of the type capable of producing gimlet pointed screws from headed cylindrical blanks. When the screw is relatively short, having only one to a few turns of the thread on the body, it is often difficult to start the blank properly between the dies. Accordingly, in this invention the vertical portions of the dies at the leading ends are widened to provide enough thread grooves to insure initial stabilization of the blank in proper rotating attitude before the blank reaches the conventionally sized pointing and slug producing portions of the dies.

SUMMARY OF THE INVENTION

In the utilization of thread rolling dies of the type herein disclosed, one of the dies is held stationary in the machine and the other die is moved back and forth in parallelism and closely adjacent thereto.

In producing screws, a headed blank with its axis in vertical position is introduced between the leading ends of the dies. As relative die motion commences, the blank is gripped and rotation begins along with initial deformation. Usually the blank to be threaded is relatively long in relation to its diameter so, when gripped by the dies of corresponding vertical dimension, it starts its rotations in correct position; that is, the axis is vertical and parallel to the die faces.

In the case of shorter screws in which the ratio of length to diameter is substantially decreased and particularly in the case of very short screws having one to a few turns of threads on the body, there is a distinct tendency for the blank, even though longer than the depth of the die, to become misaligned from correct axial position during initial rotation so that imperfect threads will be rolled.

This undesirable result is now overcome by changing the die construction so that the leading portions of the vertical grooved die surfaces of both dies are of substantially greater vertical dimension thereby to include therein as many more thread grooves as have been found customarily necessary to cause initial stabilized blank rotation.

After proper rotation is established and the threads formations have commenced in the blank to the extent of perhaps one to two full turns, then the die surfaces of both dies may return to their normal vertical dimensions. Correct rotation and threading will then continue since the thread paths were well established at the outset. Likewise, the point will be formed and threaded by the conventional die construction and the surplus material at the lower end of the blank will develop into a conventional slug to be cut off by the dies and discarded.

In making dies according to the present invention, no greater cost of materials is involved since the widened part of the leading vertical surface is a part of the die blank that heretofore would have been ground away in the forming of the reversely sloping slug producing surface. In the present construction, the slug forming surface is created by removing only material from the die that is beyond the initial widened portion. In this manner, the vertical width of that part of the die that conventionally would be available to grip initially the blank of a short screw may be more or less doubled without increasing the cost of die material.

Tests may readily determine the minimum width of the leading ends of the dies to produce proper blank stabilization. Once this is achieved, the die width may be reduced to the required dimensions for producing the screw in question.

DESCRIPTION OF THE PREFERRED EMBODIMENT

Figure 1:
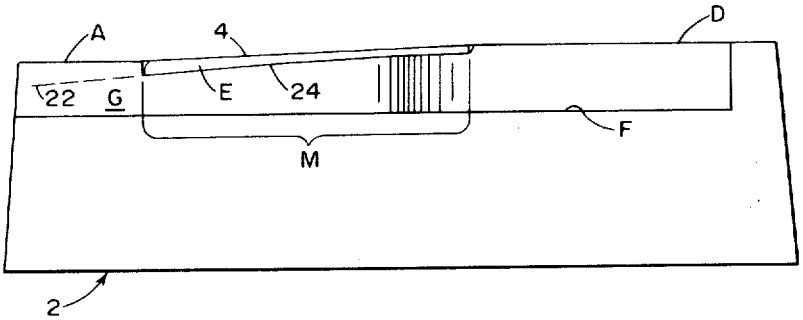
FIG. 1 is a bottom plan view of one of a pair of dies.

In the drawings is shown a single die generally referred to at 2. Those familiar with the art of rolling threads by the use of flat dies will recognize that die 2 is representative of both required dies which are identical as far as operative structure is concerned. The movable die is customarily made longer at each end to facilitate entry of the blank between the dies and safe discharge of the finished screw.

Accordingly, the description of die 2 will suffice for both dies which are identical over equal comparable lengths. It might also be pointed out that the dies when in operative position in the screw producing machine customarily have the grooved faces in vertical parallel position. Thus, the main grooved surface A which produces the threads on the body of the screw is, in use, in vertical position, although for convenience, not so shown in FIGS. 3 to 6. Reference to the various parts will hereinafter be made on the assumption that the surface A is vertical as it would be in normal use.

The top flat horizontal surface of the die is indicated at B.

The sloping surface which threads and points the screw is indicated at C and intersects surface A along the heel line 3.

The vertical bumper surface, indicated at D, limits the setting of the two dies toward each other in the machine.

The reversely sloping surface E which intersects surface C along a diagonally extending edge 4 acts in cooperation with surface C to create simultaneously the threaded screw point 6 (see FIG. 4) and the slug 7 which is the unused and discarded lower end portion of the blank.

Figure 2:
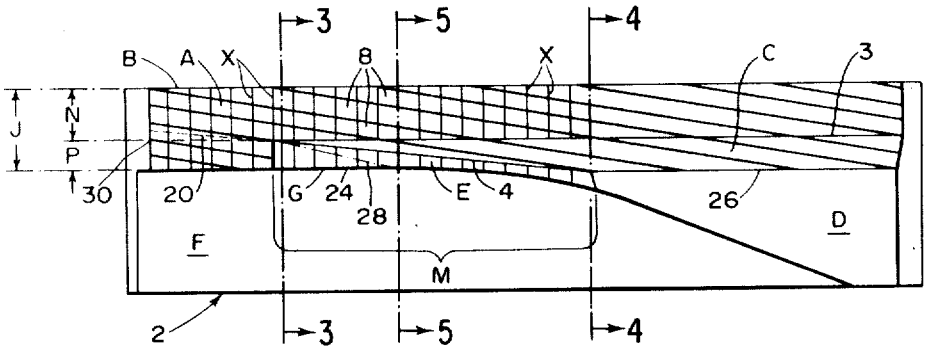
FIG. 2 is a front elevation of FIG. 1.
Figure 6:
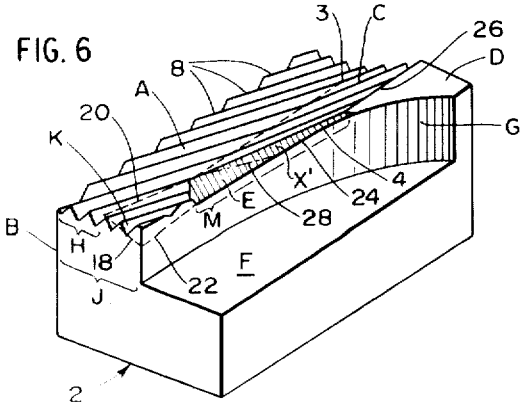
FIG. 6 is a perspective view, somewhat foreshortened, of the die shown in bottom plan and elevation in FIGS. 1 and 2.

Referring particularly to FIGS. 2 and 6, the surface A of the finished die contains a plurality of side by side grooves 8 which in accord with well understood principles, act to produce the threads 10 (see FIG. 4) on the body 12 of the blank as it is rolled between the dies. These grooves 8 continue in correct direction in the sloping surface C to produce the threads 14 on the screw point (see FIG. 4).

The underside of the screw head 16 (see FIG. 4) will rotate in sliding relation along the top surface B of the die during the threading and pointing of the screw.

In the following explanation, it should be remembered that all die blank surfaces (A, B, C, D, E, etc.) are completely formed before the thread grooves are cut therein. Hence, reference to surfaces, ungrooved, in the creation of the die will be understood as the initial forms thereof.

The manufacturing steps are as follows. First, the die blank is milled to produce the flat surfaces A, C and D. Surfaces C and D initially extend the full length of the blank. The dies are then cut away to produce the vertical wall F and the under wall G. The location and contour of wall G with respect to the top of the die B is controlled by the length of the screw to be made. Each different length of screw, even of the same body size and number of threads per inch, calls for a separate pair of dies. The die inventory obviously for a complete line of screw sizes is extensive.

With the under wall G correctly formed, the next step is to generate the reversely turned surface E. This has been customarily done by a cutting tool such as a milling cutter, for example, to cut away part of surfaces A and C starting at the dotted line 18 (see FIG. 6) and following the dotted lines 20 and 22 to continue in slightly upward and diagonal direction to create the diagonal edge 4 and the lower edge 24 which is also the boundary of under wall G.

Figure 4:
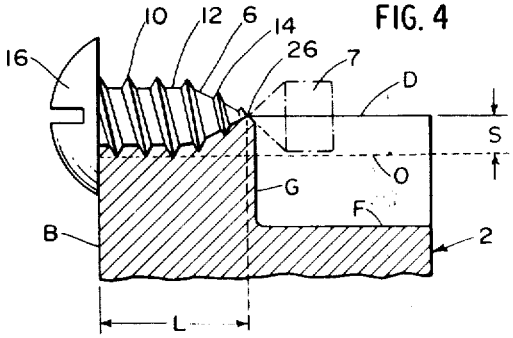
FIG. 4 is a section taken on the line 4—4 of FIG. 2, including a screw that has substantially completed at this position of the dies.

The surface E narrowed by the convergence of edges 4 and 24 terminates adjacent bumper surface D. The diagonal edge 4 preferably meets the upper edge 26 of bumper surface D so that formation and cut-off of the slug 7 will be assured when the screw has reached the position of line 4—4 in FIG. 2 and as shown in FIG. 4.

Again, by reference to FIGS. 2 and 6, it is apparent that removal of the die material bounded by dotted lines 18, 20 and 22 greatly reduces the vertical dimension of surface A (indicated by the bracket H) and the number of thread grooves thereafter to be cut into surface A in comparison with the vertical surface indicated by the bracket J that would otherwise be available.

When short screws are to be produced, it has been found that threads in surface A covering the distance H is generally insufficient to insure rolling stability in the blank. On the other hand, if all of surface A for the vertical distance J were available for thread grooves, then initial rolling stability of the blank would be assured.

Figure 3:
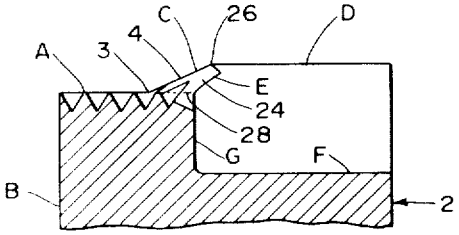
FIG. 3 is a section taken on the line 3—3 of FIG. 2.

Once the blank has commenced proper rotation, it will thereafter so continue when reaching the narrower part of surface A where the diagonal edge 4 commences at the heel line 3 and close to section lines 3—3 of FIG. 2 and as shown in FIG. 3.

According to the present invention, the full width J of surface A is preserved to provide enough stabilizing thread grooves in the leading part of the die by creating the reversely sloping surface E in a different manner. The surface C which originally extended the length of the die is cut away in part over the length indicated by the bracket M in FIGS. 1, 2 and 6 by a tool preferably moving crosswise rather than lengthwise. In so doing, the lower part of surface A at the leading end (after the removal of the remaining part of surface C) remains untouched to provide the full width J for receiving thread grooves. The surface E may be created in various ways as by filing, grinding, shaping, milling, etc., the only requirement being that the intersection with surface C at the edge 4 be sharp and straight and that the lower leading portion K of the surface A remain intact for receiving subsequent thread grooves.

Figure 5:
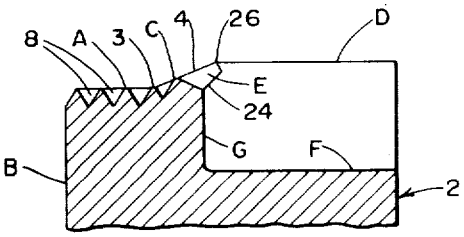
FIG. 5 is a section taken on the line 5—5 of FIG. 2.

In some special cases, it might be desirable to increase the dimension J which can easily be done by shifting the boundary wall G at the leading end to a lower level. The width of surface E in its initial stage below the dot dash line 28 is immaterial since that part of the surface does not engage the blank. Only that part of surface E above line 28 functions to produce the slug. The width of surface E over the upper reaches thereof bounded by diagonal edge 4 and the lower edge 24 is not critical. The angle of surfaces C and E with respect to surface A and to each other to create a proper point on the screw and to produce and remove the slug effectively has been found to be approximately 20°. This is shown in FIG. 5 taken on the line 5—5 of FIG. 2 where the length of the slopes on surfaces C and E are equal.

The 20° slope is a figure commonly used in this type of die and is not considered part of this invention except insofar as the angles of surfaces C and E to each other must create a wedge configuration capable of producing the required point on the screw and the slug comprising the lower end of the blank that must be formed and discarded.

In the claims, the surface A is referred to as a vertical surface. This is only for convenience in defining the structure and is not to be considered limiting should the dies be utilized in other positions in space which might be possible although in present practice is not done.

To make certain that blank rotation will occur, the surface A throughout a substantial part of its length may be cross-knicked in conventional manner as indicated by the lines X in FIG. 2. Similarly, the slug forming surface E may be cross-knicked as suggested by the lines X' in FIG. 6.

*Referring further to FIG. 2, it will be noted that if the heel line 3 (which is the line of intersection of surface A and sloping surface C) is extended to the left it will intersect the left hand starting edge of the die at the point 30. The distance from the top B of the die to position 30 is represented by the letter N, and the distance from position 30 to the bottom edge G of the starting end of the die is represented by the letter P. The overall vertical dimension of the starting end of the die in which the grooves are present throughout the entire distance is represented by the letter J.*

*Referring again to FIG. 4, the dotted line O represents a vertical plane which defines the location of the roots of all of the thread producing grooves 8. The distance S is the horizontal distance from the plane O to the line 26 which line as previously stated is the line of intersection between the sloping grooved surface C and the bumper surface D. Also referring to FIG. 4, the distance indicated by the letter L is the distance from the top B of the die to the line of intersection 26 of the sloping grooved surface C and the bumper surface D.*

*In order to clearly distinguish the present invention over all prior art patents which are at present known to the applicant and in which there may be some accidental showing of grooves in the die at the starting end thereof that are located below the extension of the heel line at the starting end of the die, applicant has in his main claims pointed out that the thread grooves for the distance N above the heel line 3 in the wider area at the starting end of the die will be insufficient by themselves to insure stabilized rolling of the blanks but that the thread grooves over the total width J of the wider area which extends above and below the heel line 3 will be adequate to insure blank stability.*

No claim is made to the method of making the dies.

It is intended to cover all changes and modifications of the example of the invention herein chosen for purposes of the disclosure which do not constitute departures from the spirit and scope of the invention.

I claim:

[1. A thread rolling die of the type described comprising a vertical grooved surface for forming threads on the body of a blank, a sloping grooved surface for pointing and forming threads on the point, a vertical bumper surface extending downwardly from said sloping grooved surface, a reversely sloping slug forming surface joining said sloping grooved surface along a diagonal edge which commences at said vertical grooved surface and terminates near said bumper surface, said vertical grooved surface being substantially wider at that area thereof in advance of said diagonal edge.]

[2. A thread rolling die of the type described comprising a vertical surface having thread producing grooves therein, said surface being substantially wider at its leading end for a limited distance, a sloping surface having thread producing grooves therein intersecting the said vertical surface along the remainder of its lower edge at the narrower part thereof, said intersection forming a heel line, a reversely sloping slug forming surface starting inside said vertical surface and below said heel line at the beginning of said narrower part and extending upwardly and crossing the plane of said vertical surface and intersecting said grooved sloping surface to form a diagonal edge on the leading portion of said sloping surface which diagonal edge commences at the said vertical surface at the leading end of said heel line and terminates at the lower edge of said grooved sloping surface.]

[3. A thread rolling die of the type described comprising a vertical grooved surface for forming threads on the body of a blank, a sloping grooved surface for pointing and forming threads on the point intersecting said vertical grooved surface along a heel line, a vertical bumper surface extending downwardly from said sloping grooved surface, a reversely sloping slug forming surface tapering toward said bumper surface and intersecting said sloping grooved surface along a diagonal edge which commences at said heel line and terminates near said bumper surface, said vertical grooved surface being substantially wider and extending below said heel line at that area thereof in advance of said diagonal edge.]

[4. A thread rolling die of the type described comprising a vertical surface having a horizontal upper edge and having thread rolling grooves therein for producing a thread on a blank, the vertical dimension of the said surface engaging the blank to be threaded decreasing substantially after a limited initial rolling distance has passed, a point forming ramp in the form of a sloping grooved surface intersecting said vertical surface at the latter's narrower dimension along a heel line parallel to the upper edge of said vertical surface, said ramp having a diagonal edge starting at said heel line and vertical surface and running toward the trailing end of the die and away from said vertical surface at a small angle thereto, and a slug forming and reversely sloping surface tapering in the direction of said trailing end and terminating at said diagonal edge and having a length substantially coextensive therewith.].

[5. A thread rolling die of the type described comprising a vertical grooved surface for creating threads on the body of a cylindrical blank, said surface being wide enough at the leading end to stabilize initial rotation of said blank, said surface for the remainder of the die being substantially narrower, and means commencing at the beginning of the narrower portion for pointing and creating a thread on the said point and means for simultaneously disposing of surplus blank material beyond said point, said last named means comprising a surface tapering in the direction of movement of said blank.]

[6. A pair of dies for producing gimlet pointed screws from a blank by the rolled thread process, each die of said pair being of identical configuration over their cooperating portions and comprising a vertical plane surface having a continuous straight upper edge and having grooves therein for creating the threads on the body of the screw, a sloping plane surface having therein continuations of said grooves and extending away from said vertical surface for creating the threaded pointed portion of said screw, the line of intersection of said vertical surface and said sloping surface forming a straight heel line, the said sloping surface having a diagonal lower edge commencing at said vertical surface and extending generally lengthwise of said die and downwardly away from said heel line at a small angle thereto, said sloping surface also having another lower edge commencing at the end of said diagonal lower edge and being parallel to said heel line, said diagonal lower edge of said sloping surface forming the upper edge of a reversely sloping slug forming and removal surface, said slug forming surface being a plane surface tapering in the direction of movement of said blank and extending at least from the point of intersection of said diagonal edge and heel line to the point of intersection of said diagonal edge and the lower parallel edge of said sloping surface, said vertical plane surface at that part thereof in advance of the beginning of said diagonal edge being of greater width and including more thread grooves than at that part between said heel line and the said upper edge of said vertical surface, whereby a blank entering said dies will initially be engaged by more thread grooves to stabilize its rotation before reaching the beginning of said diagonal edge and the fewer number of thread grooves in the remainder of said vertical surface between said heel line and said upper edge.]

[7. The construction set forth in claim 6 in which the angle of the said sloping grooved surface to the said vertical grooved surface is approximately the same as the angle of the said reversely sloping slug forming surface to said vertical grooved surface.]

[8. The combination set forth in claim 6 in which the lower portion of the die below said wider vertical area and below said reversely sloping slug forming surface is cut away to provide space for disposal of said slug when freed from said blank, and said die including a vertical bumper surface parallel to said vertical grooved surface extending downwardly from the said lower edge of said sloping grooved surface.]

*9. A thread rolling die of the type described for forming short gimlet pointed screws from blanks by the rolled thread process, said die comprising a vertical grooved surface A for forming screw threads on the body of a blank, a sloping grooved surface C intersecting said vertical grooved surface A along a heel line 3 for pointing and forming screw threads on the point, a bumper surface D intersecting and extending downwardly from said sloping grooved surface C, a reversely sloping slug forming surface E joining said sloping grooved surface C along a diagonal edge 4 which commences at said vertical grooved surface A and terminates near said bumper surface D, said vertical grooved surface A being substantially wider at that area thereof in advance of said diagonal edge 4 so that some of the grooves of the surface A at the said wider area are above the heel line 3 and some of the grooves are below the heel line 3, the number of said grooves at the said wider area at the starting end of said die above said heel line by themselves being insufficient to insure initial rolling stability of said blanks, but the number of said grooves above said heel line plus the number of said grooves below said heel line at the starting end of said die being sufficient to insure initial rolling stability of said blanks.*

*10. A pair of dies for producing short gimlet pointed screws from blanks by the rolled thread process, each die of said pair being of identical operative configuration and comprising a vertical plane surface A having grooves 8 therein for creating the threads on the body of the screw, a sloping plane surface C having therein continuations of said grooves 8 and extending away from said vertical surface A for creating the threaded pointed portion of said screw, the line of intersection of said vertical surface A and said sloping surface C forming a straight heel line 3, the said sloping surface C having a diagonal lower edge 4 commencing at said vertical surface A and extending generally lengthwise of said die and downwardly away from said heel line 3 at a small angle thereto, said diagonal lower edge 4 of said sloping surface forming the upper edge of a reversely sloping slug forming and removal surface E, said vertical plane surface A at the starting end of said die and in advance of the beginning of said diagonal edge 4 being of greater vertical dimension J and extending above and below the level of the*

*heel line 3 so that some of the grooves of the surface A at the starting end of said die are above the heel line 3 at N and some of the grooves are below the heel line 3 at P, the number of said grooves at N at the starting end of said die above said heel line by themselves being insufficient to insure initial rolling stability of said blanks but the number of said grooves at N above said heel line plus the number of said grooves below said heel at P at the starting end of said die being sufficient to insure initial rolling stability of said blanks.*

*11. A thread rolling die of the type described comprising a vertical grooved suface for forming threads on the body of a blank, a sloping grooved surface for pointing and forming threads on the point intersecting said vertical grooved surface along a heel line, a vertical bumper surface extending downwardly from said sloping grooved surface, a reversely sloping slug forming surface joining sloping grooved surface along a diagonal edge which commences at said vertical grooved surface and terminates near said bumper surface, said vertical grooved surface being substantially wider at that area thereof in advance of said diagonal edge, the grooved surface above said heel line at the starting end of said die being incapable of initiating stabilized rolling without the aid of the grooved surfaces below said heel line.*

*12. A thread rolling die of the type described comprising a vertical grooved surface for forming threads on the body of a blank, a sloping grooved surface for pointing and forming threads on the point intersecting said vertical grooved surface along a heel line, a vertical bumper surface extending downwardly from said sloping grooved surface, a reversely sloping slug forming surface tapering toward said bumper surface and intersecting said sloping grooved surface along a diagonal edge which commences at said heel line and terminates near said bumper surface, said vertical grooved surface being substantially wider and extending in part below said heel line at that area thereof in advance of said diagonal edge, the grooved surface above said heel line being incapable by itself of initiating stabilized rolling of a blank.*

*13. The construction set forth in claim 9 in which the dimension J at the starting end of the die is substantially equal to the dimension L at discharge end of the die.*

References Cited

The following references, cited by the Examiner, are of record in the patented file of this patent or the original patent.

UNITED STATES PATENTS

| | | | |
|---|---|---|---|
| 3,176,491 | 4/1965 | Mau et al. | 72—469 X |
| 3,196,654 | 7/1965 | Gordon | 72—88 |
| 2,165,009 | 7/1939 | Rosenberg | 72—88 |
| 3,217,530 | 11/1965 | Sato | 72—469 |
| 3,405,545 | 10/1968 | Orlomoski | 72—469 X |
| 3,405,547 | 10/1968 | Orlomoski | 72—469 |

MILTON S. MEHR, Primary Examiner